(12) United States Patent
Stewart et al.

(10) Patent No.: US 7,388,836 B2
(45) Date of Patent: Jun. 17, 2008

(54) SYSTEM AND METHOD FOR COMMUNICATING DATA IN A NETWORK ENVIRONMENT

(75) Inventors: Randall R. Stewart, Crystal Lake, IL (US); Peter Lei, Arlington Heights, IL (US); Patrick Mahan, Soquel, CA (US)

(73) Assignee: Cisco Technology, Inc., San Jose, CA (US)

( * ) Notice: Subject to any disclaimer, the term of this patent is extended or adjusted under 35 U.S.C. 154(b) by 1040 days.

(21) Appl. No.: 10/383,859

(22) Filed: Mar. 7, 2003

(65) Prior Publication Data

US 2004/0174816 A1    Sep. 9, 2004

(51) Int. Cl.
*H04L 1/00*    (2006.01)

(52) U.S. Cl. .................................. 370/235
(58) Field of Classification Search ............. 370/232, 370/231, 230.1, 229, 230
See application file for complete search history.

(56) References Cited

U.S. PATENT DOCUMENTS

| | | | | |
|---|---|---|---|---|
| 5,958,017 A * | 9/1999 | Scott et al. ............... | 709/235 |
| 6,137,527 A * | 10/2000 | Abdel-Malek et al. ...... | 348/77 |
| 6,324,582 B1 | 11/2001 | Sridhar et al. ............ | 709/230 |
| 6,385,175 B1 | 5/2002 | Dove ...................... | 370/255 |
| 6,405,337 B1 * | 6/2002 | Grohn et al. .............. | 714/749 |
| 6,415,329 B1 | 7/2002 | Gelman et al. ........... | 709/245 |
| 6,477,370 B1 | 11/2002 | Sigler et al. ............... | 455/427 |
| 6,529,477 B1 | 3/2003 | Toporek et al. ........... | 370/235 |
| 6,529,731 B2 | 3/2003 | Modzelesky et al. ...... | 455/427 |
| 6,553,032 B1 * | 4/2003 | Farley et al. .............. | 370/394 |
| 6,961,539 B2 * | 11/2005 | Schweinhart et al. ...... | 455/12.1 |
| 7,116,636 B2 * | 10/2006 | Vernon ..................... | 370/232 |

OTHER PUBLICATIONS

H. Jiang, C. Dovrolis, "Passive Estimation of TCP Round-Trip Times," Computer Communication Review, Association for Computing Machinery, New York, vol. 32, No. 3, pp. 75-88, XP-001133033, Jul. 2002.

Pai-Hsiang Hsiao, H.T. Kung, Koan-Sin Tan, "Video over TCP with Receiver-based Delay Control," Proceedings of the 11th, International Workshop on Network and Operating Systems Support for Digital Audio and Video, Port Jefferson, New York, pp. 199-208, XP-001134309, Jun. 25, 2001.

(Continued)

*Primary Examiner*—Frank Duong
(74) *Attorney, Agent, or Firm*—Baker Botts L.L.P.

(57) ABSTRACT

A method for communicating data in a network environment is provided that includes receiving one or more packets for establishing a communication session in a network and determining which of the packets should be delayed. A selected one or more of the packets are delayed for a designated time interval in order to extend a roundtrip time (RTT) parameter associated with the selected packets. The selected packets are communicated after the time interval has expired.

24 Claims, 2 Drawing Sheets

OTHER PUBLICATIONS

Pai-Hsiang Hsiao, H.T. Kung, Koan-Sin Tan, "Active Delay Control for TCP," Globecom'01, 2001 IEEE Global Telecommunications Conference, San Antonio, TX, IEEE Global Telecommunications Conference, New York, NY, vol. 3 of 6, pp. 1626-1631, XP-001054853, Nov. 25, 2001.

A. Koike, "Active TCP Control by a Network," Institute of Electrical and Electronics Engineers, 1999 IEEE Global Telecommunications Conference, Globecom'99, Seamless Interconnection for Universal Services, Rio de Janeiro, Brazil, IEEE Global Telecommunications Conference, New York, NY, vol. 3, pp. 1921-1925, XP-001003933, Dec. 5, 1999.

E. Nahum, T. Barzilai, and D.D. Kandlur, "Performance Issues in WWW Servers," IEEE/ACM Transactions on Networking, vol. 10, No. 1, 10 pages, Feb. 2002.

* cited by examiner

SYSTEM AND METHOD FOR COMMUNICATING DATA IN A NETWORK ENVIRONMENT

TECHNICAL FIELD OF THE INVENTION

This invention relates in general to the field of communications and more particularly to a system and method for communicating data in a network environment.

BACKGROUND OF THE INVENTION

The field of network communications has become increasingly important in today's society. One area of importance associated with network communications relates to data management. Data management techniques may be implemented in order to properly direct traffic in a network while providing minimal delays and negligible losses for associated information propagating through the communications architecture. Certain communication protocols that are generally used to communicate information from one point to another may be hindered by their inability to effectively identify network parameters that affect their ability to quickly and accurately deliver information to its intended destination.

Additionally, in executing proper data management, it is important to minimize bottlenecks, impedances, and other points of congestion caused by increased communications or excessive loss rates prevalent in the communication system. In certain instances, elements such as congestion and bottlenecks may be viewed as a loss of information, whereby duplicate data segments are sent in response to an excess error rate that is produced. Thus, the ability to effectively manage data and to minimize packet losses and delays present in a network provides a significant challenge to network designers and communication system operators.

SUMMARY OF THE INVENTION

From the foregoing, it may be appreciated by those skilled in the art that a need has arisen for an improved data management approach that offers proper information allocation for devices or components in a network environment. In accordance with one embodiment of the present invention, a system and method for communicating data are provided that substantially eliminate or greatly reduce disadvantages and problems associated with conventional data management techniques.

According to one embodiment of the present invention, there is provided a method for communicating data that includes receiving one or more packets for establishing a communication session in a network and determining which of the packets should be delayed. A selected one or more of the packets are delayed for a designated time interval in order to extend a roundtrip time (RTT) parameter associated with the selected packets. The selected packets are communicated after the time interval has expired.

Certain embodiments of the present invention may provide a number of technical advantages. For example, according to one embodiment of the present invention, a data management approach is provided that intentionally imparts a delay for selected packets of information in order to minimize congestion in the network and to maximize bandwidth utilization. This is a result of identifying a proper retransmission timeout (RTO) value associated with the information. The RTO value may be used in conjunction with an algorithm in order to provide a variance for data propagating in the network. This may result in a delay interval being provided for the packet in order to optimally deliver data to its intended destination.

Another technical advantage associated with one embodiment of the present invention relates to a number of data management features or capabilities that may be implemented on a given network element. Such features may include acknowledgment (ACK) splitting, retransmission processes, and window scaling manipulations. These features may be provided in conjunction with the protocol being used to communicate information from one point to another. These features may also be used in various combinations (or independently) in order to properly direct information in the network. In addition, these features may be provided at selected locations in the network such as, for example, in multiple network elements where appropriate. The implementation and positioning of these features is a result of the substantial flexibility offered by the teachings of the present invention. Accordingly, these features may be provided in any suitable location in order to effectuate the proper management and routing of data in the network.

Yet another technical advantage associated with one embodiment of the present invention relates to its implementation. The end-to-end model may be preserved and, thus, minimal changes may be required for an end host stack. Additionally, such an implementation may be effectuated while still realizing a full utilization of bandwidth being provided by the link facilitating communications between two network elements. Accordingly, a performance enhancement associated with the effective management of data may be achieved in cooperation with elements and objects already present in a given architecture. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
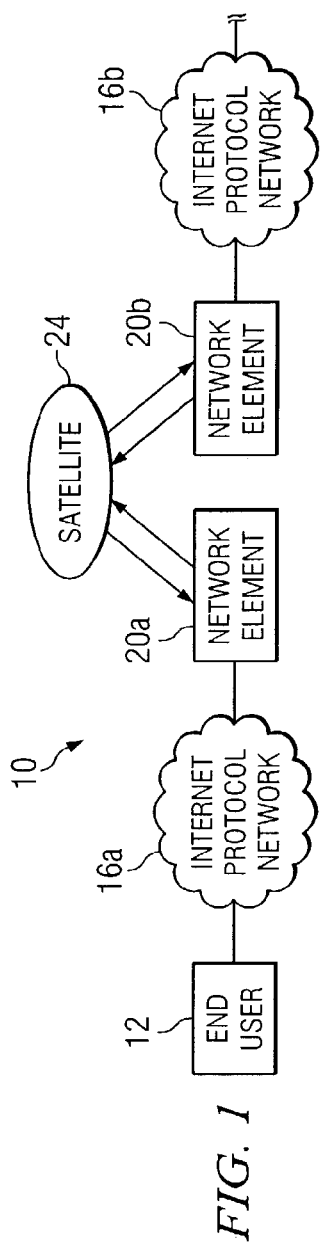
FIG. 1 is a simplified block diagram of a communication system for communicating data in a network environment.

FIG. 1 is a simplified block diagram of a communication system 10 for managing data in a network environment in accordance with one embodiment of the present invention. Communication system 10 includes an end user 12, multiple internet protocol (IP) networks 16a and 16b, multiple network elements 20a and 20b, and a satellite 24. Communication system 10 may be positioned in any suitable network environment or communications architecture such as, for example, in conjunction with a non-terrestrial (satellite) link, a 2.5 G or 3 G cellular data network configuration, or a standard transmission control protocol/internet protocol (TCP/IP) architecture that seeks to receive, transmit, or otherwise direct packets of information in a network. Communications system 10 may also be positioned in any other environment that experiences some delay in communications between nodes in a network.

According to the teachings of one embodiment of the present invention, communication system 10 operates to provide an environment for properly managing data such that it propagates through the network in an efficient manner. Communication system 10 may cooperate with a communications protocol associated with communication system 10 that is implemented in network elements 20a and 20b. The protocol may tunnel incoming IP packets across a link between network elements 20a and 20b. This may be a satellite link provided by satellite 24 for example. The packets to be tunneled may be based on an IP protocol that may allow existing enhancements and solutions (or legacy applications) to co-exist.

Network elements 20a-20b may operate to insert a delay at one or both ends of a forwarding path and may cause an end host to modify the round trip time (RTT) and retransmission timeout (RTO) values via the satellite link in order to mitigate packet loss or congestion in the network. This operation may prevent the end host from retransmitting and collapsing the retransmission rate as may be dictated by the protocol being implemented. In addition, communication system 10 may provide a delay that is based on the number of local retransmissions desired. The delay reflects a calculated variable that may be based on the number of retransmissions currently being implemented. The delay allows the protocol to accommodate or to recover from large burst errors on the corresponding satellite link. Moreover, such an implementation may be provided with minimal protocol overhead and insignificant header configurations for packets propagating in the network.

Communication system 10 offers a data management approach that intentionally imparts a delay for selected packets of information in order to minimize congestion and packet loss issues in the network and to maximize bandwidth utilization. This is a result of identifying a proper RTO value associated with the information. The RTO value may be used in conjunction with a suitable algorithm in order to provide a variance for data propagating in the network. The prescribed RTO may result in a time interval being provided for the packet that allows it to be delivered to its intended destination within an optimal time interval.

Communications system 10 may also provide a number of data management features for selected network elements 20a and 20b. Such features may include acknowledgment (ACK) splitting, retransmission processes, and manipulation of a window scaling option that may be provided in conjunction with the protocol being used to communicate information from one point to another. These features may be used in combination (or independently) to properly direct information in the network. Additionally, these features may be provided in any suitable location in order to effectuate the proper management of data in the network. Such an implementation may also preserve an end-to-end model and result in no, or minimal, changes being required for an end host stack to benefit from the architecture of the present invention. Accordingly, the performance enhancement associated with the effective management of data may be achieved in cooperation with elements and objects already present in a given architecture.

End user 12 is a client or an entity seeking to initiate or to establish a communication session in communication system 10 via IP network 16a. A 'communication session' is inclusive of communication links, tunnels, and/or other suitable connections or couplings used to facilitate a data exchange. End user 12 may also be referred to as an 'end host' and inclusive of devices used to initiate a communication such as a computer, a personal digital assistant (PDA), a laptop or an electronic notebook, a telephone, a mobile station, or any other device, component, element, or object capable of initiating voice, video stream, or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). Moreover, end user 12, as illustrated in FIG. 1, may also be any device that seeks to initiate a communication session on behalf of another entity or element such as a program, a database, or any other component, device, element, or object capable of initiating voice, video, or data exchanges within communication system 10. Data, as used herein in this document, refers to any type of numeric, voice, or script data, or any type of source or object code, or any other suitable information in any appropriate format that may be communicated from one point to another.

IP networks 16a and 16b each represent a series of points or nodes of interconnected communication paths for receiving and transmitting packets of information that propagate through communication system 10. In a particular embodiment, IP networks 16a or 16b represent a packet data network (PDN). IP networks 16a and 16b may also offer a communications interface between end hosts and network elements 20a and 20b. IP networks 16a and 16b may alternatively be any local area network (LAN), metropolitan area network (MAN), wide area network (WAN), virtual private network (VPN), wireless local area network (WLAN), intranet, or any other appropriate architecture or system that facilitates network communications. IP networks 16a and 16b may implement a TCP/IP communications language protocol in a particular embodiment of the present invention. In addition, IP security (IPSEC) authentication and encryption may be applied to the communications between 16a and 16b. However, IP networks 16a and 16b may alternatively implement any other suitable communications protocol for transmitting and receiving data packets within communication system 10.

Network elements 20a-b are pieces of network equipment operable to communicate in a network environment. Network elements 20a-b may manage, direct, or otherwise facilitate the propagation of information between two nodes in a network. Network elements 20a-b are routers in one embodiment, but may alternatively be a switch, a bridge, a gateway, a processor, a loadbalancer, or any other suitable component, device, element, or object operable to exchange information or data. Additionally, each of network elements 20a-b may include any suitable hardware, software, component, object, or element operable to execute one or more of the operations thereof, or to provide some communication or processing capability to network elements 20a-b. In operation, network elements 20a-b may provide a communications platform for end user 12 and include a satellite link to satellite 24. Each of network elements 20a-b may transmit (and process where appropriate) and receive data packets in order to provide selected information to an end host, such as end user 12 for example. Additionally, network elements 20a-b may communicate with each other and perform hand shaking operations in order to ensure that communications are being properly routed or otherwise managed in the network.

Satellite 24 is a non-terrestrial element that provides a satellite communications link for network elements 20a and 20b. Satellite 24 is operable to transmit, receive, and process (where appropriate) packets of information. Satellite 24 is capable of high speed communications and may include suitable interfaces for the reception and transmission of information. Satellite 24 may also include processing elements operable to execute one or more operations on incoming data segments. Satellite 24 may be deleted in certain embodiments such that network elements 20a-b are coupled directly to each other or are provided with another suitable communications interface. For example, satellite 24 may be substituted with any suitable terrestrial element such as a router, a switch, a bridge, a gateway, or any other appropriate interface. Alternatively, satellite 24 may be replaced with a number of other suitable devices operable to facilitate various communication applications. Certain alternatives are discussed in greater detail below.

Communication system 10 may be implemented in conjunction with any element that uses an IP based transport protocol (such as TCP) and includes a salient amount of error that operates to skew or to negatively affect TCP communications. Satellite 24 has been offered for purposes of example only. Other applications for communication system 10 may include wireless protocols, cellular/mobile phone data capable of communicating using IP packets, network access servers (NAS), gateway general packet radio service (GPRS) support node (GGSN), public switch telephone networks (PSTN), serving GPRS support nodes (SGSN), global system for mobile (GSM) environments, etc.

In operation of an example embodiment, end user 12 may be seeking to retrieve data or information provided by (or in conjunction with) IP network 16b. For example, end user 12 may be seeking to contact a web server coupled to IP network 16b. The web server may represent a program that, using the client/server model and the worldwide web's hypertext transfer protocol (HTTP), serves the files that form web pages to web users. The packet initiated by end user 12 may be communicated from IP network 16a to network element 20a (assuming no loss) and transmitted immediately to network element 20b. Network element 20b may hold the packet for another satellite link RTO and then release the packet to IP network 16b. IP network 16b may acknowledge receipt of the packet and then the packet may be sent back to network element 20b. The packet may then be held again on the releasing side and the acknowledgment of its receipt may also be communicated. Thus, three RTOs may be used to allow the packet to propagate across the network. Additionally, the window size provided by TCP may be effectively increased. This operation may be combined with sending a flag in the packet that signifies how long the packet was delayed. Another flag may also be included in the packet that indicates that it is being retransmitted. Additionally, details relating to other example implementations are provided below.

Figure 2:
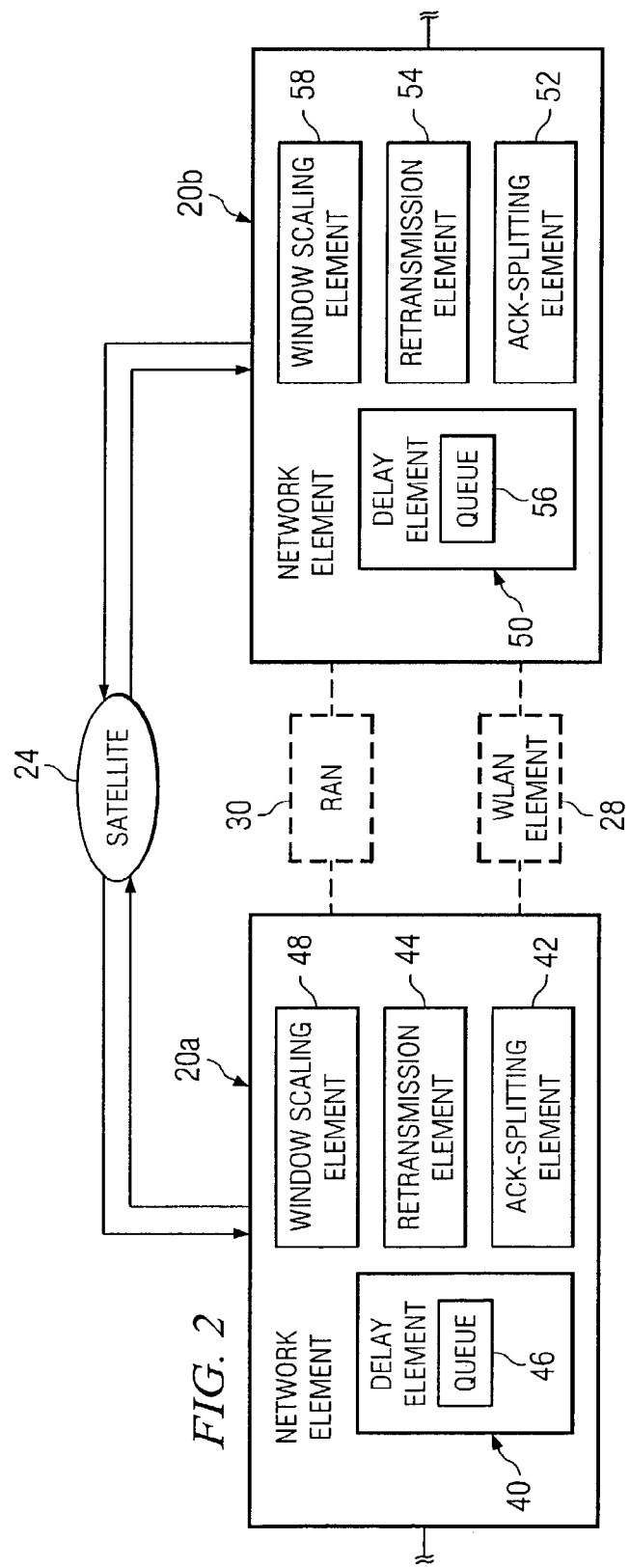
FIG. 2 is a simplified block diagram of multiple network elements included within the communication system.

FIG. 2 is a simplified block diagram of network elements 20a and 20b, reflecting an example embodiment of the present invention. Network element 20a may include a delay element 40, an ACK splitting element 42, a retransmission element 44, and a window scaling element 48. Additionally, delay element 40 may include (or be coupled to) a queue 46. Similarly, network element 20b may include a delay element 50, an ACK splitting element 52, a retransmission element 54, and a window scaling element 58. Additionally, delay element 50 may include (or be coupled to) a queue 56. Network elements 20a and 20b may communicate using satellite 24 as an interface as described above. Alternatively, network elements 20a and 20b may communicate directly or via a wireless local access network (WLAN) element 28 or a radio access network (RAN) 30. Each of these elements (satellite 24, WLAN element 28, and RAN 30) may be used as the only element facilitating communications between network element 20a and network element 20b. Alternatively, these elements may be combined in any suitable fashion in order to facilitate the reception and transmission of data between network elements 20a and 20b. Additionally, WLAN element 28 and RAN 30 may be provided at other suitable locations in communication system 10 in order to facilitate data exchanges in the network. For example, these elements may be positioned in order to provide a platform that allows end user 12 to log onto IP network 16a. This may be inclusive of authorization and authentication procedures executed by these elements for an end host (e.g. end user 12).

WLAN element 28 is a wireless component or platform that allows end user 12 to connect to a local network through a wireless or a radio connection. Such a platform may be generally based on the IEEE 802.11 standard or on any other suitable architecture that provides for wireless communications in a network environment. WLAN element 28, as referred to herein, may also be representative of a 'hot spot' or a public WLAN (PWLAN) where appropriate. WLAN element 28 may be deployed in such public places as coffee shops, airports, restaurants, hotels, and conference centers, for example, as a way to provide connectivity for end user 12.

WLAN element 28 may be coupled to end user 12 or any device being used by end user 12 such as a mobile station, a PDA, or a laptop for example. WLAN element 28 may also be coupled to network elements 20a and 20b and facilitate authentication procedures for end user 12 by communicating with a corresponding network. Suitable encryption protocols may be included within a protocol associated with WLAN element 28 where appropriate and according to particular needs.

RAN 30 is a communications interface or platform operating between network elements 20a and 20b. Alternatively, RAN 30 may be positioned between an end host (e.g. end user 12) and network element 20a in order to provide access thereto. RAN 30 may comprise a base transceiver station and a base station controller. The communications interface provided by RAN 30 allows data to be exchanged between end user 12 or network elements 20a-b and any number of selected elements within communication system 10. RAN 30 facilitates the delivery of a request packet generated by end user 12 and the reception of information sought by end user 12. RAN 30 offers only one example of a communications interface as other types of communications interfaces or platforms may be used for any particular network design or configuration in accordance with particular needs.

The elements included within network elements 20a and 20b operate to facilitate data management in order properly direct and allocate information in communication system 10. Delay elements 40 and 50 may be used in order to insert a proper time interval or delay in order to deliver information in an optimal fashion in communication system 10. Queues 46 and 56 may be used in order to store packets that are selected for delay and which may be subsequently released when the prescribed time interval has expired.

Delay may only be configured on one side of the satellite (or communications) link where appropriate. For example, if data is heavily flowing into IP network 16b from IP network 16a, we may implement a delay only on one side and thereby lower the RTO overall. In this manner, loss can be made up for in one direction. Alternatively, delay may be positioned on both sides of the communication link. RTO, as referred to herein in this document, reflects a calculated value associated with retransmission. For example, in TCP environments, an RTO initial of three seconds may be a default value that is provided. A synchronization (SYN) packet may then be used to initiate a connection. A peer may than send a SYN-ACK and this operation may be timed. This information can now be used in conjunction with an algorithm in order to calculate an effective RTO. This represents a smooth roundtrip with no ambiguity. An RTO may be suitably calculated that includes a variance where appropriate.

Certain protocols, such as TCP, may include an RTO minimum. If an RTT is calculated for a given destination, the timer associated with the operation may be set to an RTO minimum before retransmitting and presuming something is wrong. For example, this timer may be set to one (1) second. A delay segment may be inserted on each side of the communications link (interposed between network elements 20a and 20b) and inclusive of an extra RTO delay. When TCP initially makes contact, it may set a timer to three seconds (referred to as an RTO initial because TCP does not know the exact propagation distance). A first calculation associated with a given packet is then executed. If a delay is inserted on each side of the communications link (equaling one RTO before packets are released in the network), the packet may now take over 1.6 seconds to complete a roundtrip in an example embodiment. Accordingly, network elements 20a-b are programmed or configured to accommodate this value. The RTT and RTO between network elements 20a-b is computed to help with the determination of whether or not to release information immediately.

The positioning of the delay for selected packets may allow some traffic to be protected while other traffic is not addressed. For example, if web requests are being executed in one direction, it may not be important to delay this information. However, it may be optimal to view data from the web page as quickly as possible. This data can be protected such that any loss in such a communication session is not seen.

Retransmission elements 44 and 54 are software elements that may be used in order to resend information that may be identified as lost or that may be recognized as having encountered an error. ACK splitting elements 42 and 52 may be used in order to replicate information such that multiple copies of data segments are duplicated and slightly changed before being sent to its intended destination. ACK splitting takes one TCP-ACK and splits it into many individual TCP-ACKs that in total cover the original ACK value. This allows more data to be communicated over a corresponding network more quickly.

Window scaling elements 48 and 58 are software elements that may be used to properly manipulate window scaling features that are provided in conjunction with a protocol being used to facilitate the delivery of information to and from network elements 20a and 20b. When TCP initializes, a window scaling option is provided. A window scale of zero provides a 1:1 correlation of data. A window scale of one translates into a multiple (or a factor) of two. Thus, for example, a window scale of two translates into a multiple of four. Window scaling (also referred to as window stuffing) allows more data to travel over the communications link than would travel over the link as dictated by the associated protocol.

Each of the elements included within network elements 20a and 20b may be implemented using software in accordance with a particular embodiment of the present invention. Alternatively, each of these elements may be included in appropriate hardware, or within components, devices, or any other suitable objects or elements that effectuate the operations of network elements 20a-b. Also, any one or more of these capabilities or operations may be provided external to network elements 20a and 20b or combined in any suitable configuration, module, system, or architecture where appropriate and in accordance with particular needs.

In operation, window scaling elements 48 and 58 manipulate a receive window (rwnd) provided in a TCP communications protocol. The receive window dictates how much data a peer may allow a sender to have outstanding before an acknowledgment signal is received. When a loss is identified, it may be assumed that there is an overflow in certain protocols. Such protocols may respond to this presumption by signaling that certain elements can only have a single packet outstanding before receiving an acknowledgement. Accordingly, with every acknowledgment, another packet may be freed to be sent. For example, a packet may be sent and an acknowledgment received. Then two packets may be sent, and then three, and so forth. In TCP operations, congestion may be viewed as a loss, whereby congestion is presumed and data propagation is inhibited. A congestion window may also be provided within certain protocols that determines a traffic pattern associated with the network.

In operation, ACK splitting elements 42 and 52, included in network elements 20a and 20b respectively, may execute ACK splitting techniques on selected packets where appropriate. When a TCP-ACK is identified as propagating over a communications link, it may be replicated multiple times and changed slightly in order to allow the sender to communicate more data to the network more quickly. This operation may address the ramp up of data or 'slow start' issue endemic of the TCP protocol. Network elements 20a and 20b may analyze TCP packets in order to execute this operation and thereby allow IP networks 16a and 16b to send more data in a given time interval.

In operation of an example embodiment (assuming that a network has just been initiated or booted), before end user 12 may communicate, network elements 20a and 20b establish a communicative platform. This forms the protocol link and may facilitate/allow the retransmission operation to be executed at a later time. User data may be forwarded once the connection is established. End user 12 may open a connection by sending a TCP-SYN packet to network element 20a. In an example embodiment, an HTTP request is being initiated by end user 12. Network element 20a may encapsulate the packet using the implemented protocol and then tag the packet with a sequence number such that an extra header is provided in front of the IP packet. The IP packet may be transmitted across the communications link to network element 20b. Network element 20b may decapsulate the header from the IP packet and send a localized acknowledgment to network element 20a for that packet.

If a delay is selected, either delay element 40 or 50 is invoked (depending on where the communication was initiated) and the packet may be positioned in queue 46 or 56. If not, an evaluation may be made as to whether an ACK splitting operation is necessary. If it is necessary, the ACK splitting is effectuated by ACK splitting elements 42 or 52. Because in the example provided a SYN packet is being received, a window stuffing operation may be executed. Thus, the window being advertised is increased, which results in network element 20b believing that network element 20a can accommodate more data than would otherwise be expected.

Network element 20b may then perform the same process for a SYN-ACK packet. Network element 20b may tag the packet with a sequence number and communicate the packet via the communications link being provided by satellite 24. Network element 20a may acknowledge locally to network 20b that it has received the packet. The same checks may then be executed. It may be determined whether ACK splitting, delay, or window stuffing is appropriate. If no delay is selected, the packet may be released to the network immediately. Where window stuffing is appropriate, the acknowledgement signal may be received and the IP connection established. Now a data transfer has been established and information exchange may be achieved.

In an example embodiment, a time stamp is designated for the packet based on when it arrived at either of network elements 20a or 20b. Where a delay is being executed for the packet, the packet may sit in either queue 56 or queue 46 and be appropriately delayed until it is ready to be released. Similar checks may then be executed involving window stuffing and ACK splitting operations.

After an ACK signal is sent from network element 20b to network element 20a that acknowledges the HTTP request, it is evaluated whether a delay is necessary. An evaluation may then be made whether ACK splitting is appropriate. In the case where an ACK splitting operation is necessary, a configurable number of ACKs is produced. Thus, 'n' ACKs are generated back out to end user 12 (provided that the ACK level is 'n') and accordingly 'n' ACKs are sent for a single ACK across the satellite link. If n=10, this forces end user 12 (or any other host coupled to network element 20a) to increase its congestion window by ten segments instead of one. A stable transfer of data is now established.

In another embodiment, it is assumed that some piece of data is lost in flight from network element 20b to end user 12. A given packet may be sent from network element 20b across satellite 24 and the packet may not reach network element 20a for whatever reason. This may be recognized by network element 20b, which fails to receive an acknowledgement signal (ACK) for the IP packet. Network element 20b may retransmit the packet and include a flag therein that indicates it is a retransmitted packet. Network element 20a may then acknowledge that this packet has finally been received, the acknowledgement being delivered to network element 20b. If no delay is selected, the packet may be released and standard checks may be performed. If we assume for purposes of example that a delay has been effectuated at network element 20a, all packets may be delayed at network element 20a. Thus, two flags may be present in the packet. One flag may indicate that it has been retransmitted and a second flag may indicate how long it has been waiting to be released. Network element 20a may also look at the time stamp provided by network element 20b and subtract that time from the designated delay time. The delay may therefore be scaled back based on the history of the packet in order to normalize the delay. Packets may be released immediately and delay queues may be bypassed entirely where it is imperative to get the packet to its next destination as quickly as possible. For shorter latency networks, packets may be retransmitted several times in which case a transmit flag and the amount of delay based on time spent in the queue may be signaled in the packet. Synchronization parameters may dictate one or more of these retransmission processes.

In cases where a stream control transmission protocol (SCTP) is being used, such a protocol may not provide a window scaling option. Instead, SCTP may provide a selective acknowledgement (SACK) or an acknowledgement that fully describes the intervening pieces of a data flow (instead of just providing cumulative information of the data flow). Thus, the SACK may include a thirty-two bit window. Each time the SACK comes over the communications link, the window stuffing parameter may be manipulated in order to increase the window by shifting and multiplying every SACK in order to advertise that more data may be received at a given network element 20a or 20b.

Figure 3:
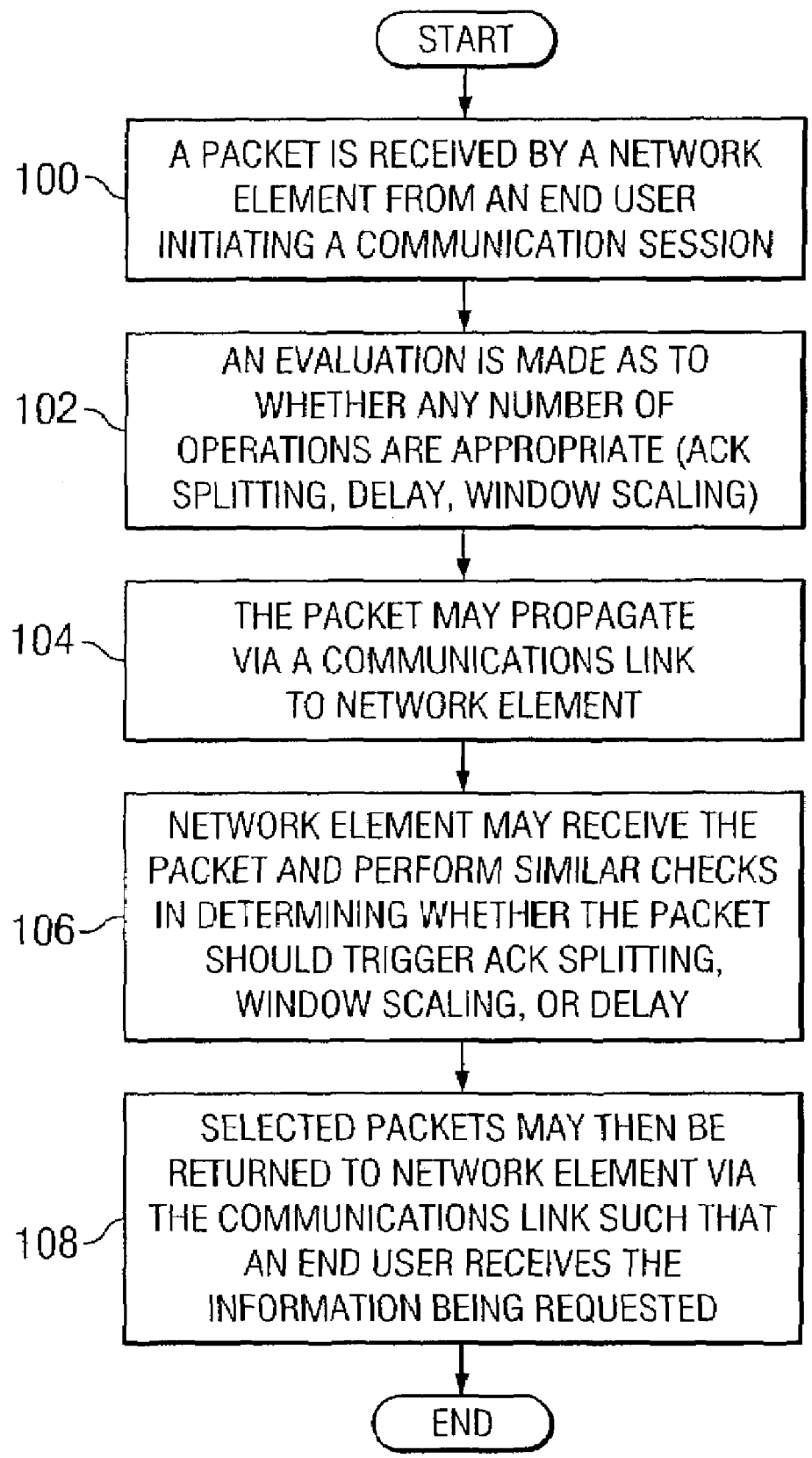
FIG. 3 is a flowchart illustrating a series of example steps associated with a method for communicating data in a network environment.

FIG. 3 is a simplified flowchart illustrating a series of example steps associated with a method for communicating data in a network environment. The method begins at step 100 where a packet is received by network element 20a. The packet may be initiated by end user 12 and used to establish a communication session in the network. At step 102, an evaluation may be made as to whether any number of operations are appropriate. For example, ACK splitting may be executed or a delay element may be provided to the packet. Alternatively, the window scaling option may be manipulated at this stage by whichever network element 20a-b is holding the packet. At step 104, the packet may propagate via a satellite link (or any other suitable communications link) provided by satellite 24 (or any other suitable communications interface) to network element 20b. Alternatively, the packet may travel via WLAN element 28 or RAN 30 or any other suitable element where appropriate and in accordance with particular needs.

At step 106, network element 20b may receive the packet and perform similar checks in determining whether the packet should trigger ACK splitting, window stuffing, or a delay. At step 108, selected packets may then be returned to network element 20a via the communications link such that end user 12 receives the information being requested in an optimal time interval. Some of the steps illustrated in FIG. 3 may be changed or deleted where appropriate and additional steps may also be added to the flowchart. These changes may be based on specific system architectures or particular communications arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in a particular network configuration, the present invention may be used in any networking environment that seeks to manage data or resources associated with end user 12 or the corresponding communication architecture. For example, communication system 10 may be implemented in conjunction with a GGSN or an SGSN, providing a communications medium in a GPRS service network environment. Where communication system 10 is implemented in a GPRS environment, a series of IP network gateways may be provided and each may include a GGSN that works in conjunction with the SGSNs in communicating high-speed data exchanges within communication system 10. GPRS may support multiple internet communication protocols and may enable existing IP, X.25, or any other suitable applications or protocols to operate over GSM connections. Communication system 10 may also be used in conjunction with packet data service nodes (PDSN), wireless elements, or a NAS where appropriate and based on particular networking needs.

Additionally, although the present invention has been described with reference to communications between end user 12 and IP networks 16a and 16b, the data communications approach described herein may be implemented for communications between any components within or external to a network. The present invention has merely described end user 12 and IP networks 16*a* and 16*b* for teaching and instructional purposes. This should not be construed to limit how or where the routing protocol of the present invention is implemented. Communication system 10 may be implemented in conjunction with any architecture or configuration that seeks to maximize bandwidth capabilities and/or manage data that experiences some latency or delay in propagation. Moreover, the processing and routing configurations disclosed above may be implemented in conjunction with any component, unit, hardware, software, object, or element involved in the communications process. Such elements may be external to network elements 20*a*-*b* or provided in conjunction therewith.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method for communicating data in a network environment, comprising:
   receiving one or more packets for establishing a communication session in a network;
   determining which of the packets should be delayed;
   delaying a selected one or more of the packets for a designated time interval in order to extend a roundtrip time parameter associated with the selected packets; and
   communicating the selected packets after the time interval has expired, wherein the delay that is inserted is based on a number of local retransmissions that is selected.

2. The method of claim 1, further comprising:
   executing acknowledgement splitting on one or more of the packets in order to allow more data to be communicated in the network.

3. The method of claim 1, further comprising:
   retransmitting one or more of the packets in response to identifying that one or more of the packets has not been received at a destination location.

4. The method of claim 3, further comprising:
   providing a retransmit flag in one or more of the packets that are retransmitted.

5. The method of claim 1, further comprising:
   manipulating a window scaling parameter included within a protocol associated with the communication session in order to allow more data to be received by a network element associated with initiating the communication session in the network.

6. The method of claim 1, further comprising:
   storing one or more of the selected packets before the selected packets are released, the selected packets being released once the time interval has expired.

7. An apparatus for communicating data in a network environment, comprising:
   a first network element operable to receive one or more packets for establishing a communication session in a network, the first network element including:
   a delay element operable to determine which of the packets should be delayed and to delay a selected one or more of the packets for a designated time interval in order to extend a roundtrip time parameter associated with the selected packets which are to be communicated to a second network element, wherein the selected packets are communicated after the time interval has expired, wherein the delay that is inserted is based on a number of local retransmissions that is selected.

8. The apparatus of claim 7, further comprising:
   an acknowledgement splitting element operable to execute acknowledgement splitting on one or more of the packets in order to allow more data to be communicated in the network.

9. The apparatus of claim 7, further comprising:
   a retransmission element operable to retransmit one or more of the packets in response to identifying that one or more of the packets has not been received at a destination location.

10. The apparatus of claim 9, wherein one or more of the packets include a retransmit flag indicating that one or more of the packets are being retransmitted, and wherein one or more of the packets include a time flag that indicates how long one or more of the packets have been waiting to be communicated to the destination location.

11. The apparatus of claim 7, further comprising:
    a window scaling element operable to manipulate a window scaling parameter included within a protocol associated with the communication session in order to allow more data to be received by the first network element.

12. The apparatus of claim 7, further comprising:
    a queue operable to store one or more of the selected packets before the selected packets are released.

13. A system for communicating data in a network environment, comprising:
    means for receiving one or more packets for establishing a communication session in a network;
    means for determining which of the packets should be delayed;
    means for delaying a selected one or more of the packets for a designated time interval in order to extend a roundtrip time parameter associated with the selected packets; and
    means for communicating the selected packets after the time interval has expired, wherein the delay that is inserted is based on a number of local retransmissions that is selected.

14. The system of claim 13, further comprising:
    means for executing acknowledgement splitting on one or more of the packets in order to allow more data to be communicated in the network.

15. The system of claim 13, further comprising:
    means for retransmitting one or more of the packets in response to identifying that one or more of the packets has not been received at a destination location.

16. The system of claim 15, further comprising:
    means for providing a retransmit flag in one or more of the packets that are retransmitted.

17. The system of claim 13, further comprising:
    means for manipulating a window scaling parameter included within a protocol associated with the communication session in order to allow more data to be received by a network element associated with initiating the communication session in the network.

18. The system of claim 13, further comprising:
    means for storing one or more of the selected packets in a queue before the selected packets are released, the selected packets being released once the time interval has expired.

19. A computer readable medium comprising code for communicating data in a network environment, the code operable to:
receive one or more packets for establishing a communication session in a network;
determine which of the packets should be delayed;
delay a selected one or more of the packets for a designated time interval in order to extend a roundtrip time parameter associated with the selected packets; and
communicate the selected packets after the time interval has expired, wherein the delay that is inserted is based on a number of local retransmissions that is selected.

20. The medium of claim 19, wherein the code is further operable to:
execute acknowledgement splitting on one or more of the packets in order to allow more data to be communicated in the network.

21. The medium of claim 19, wherein the code is further operable to:
retransmit one or more of the packets in response to identifying that one or more of the packets has not been received at a destination location.

22. The medium of claim 21, wherein the code is further operable to:
provide a retransmit flag in one or more of the packets that are retransmitted.

23. The medium of claim 19, wherein the code is further operable to:
manipulate a window scaling parameter included within a protocol associated with the communication session in order to allow more data to be received by a network element associated with initiating the communication session in the network.

24. The medium of claim 19, wherein the code is further operable to:
store one or more of the selected packets before the selected packets are released, the selected packets being released once the time interval has expired.

* * * * *